United States Patent
Kahn

(10) Patent No.: US 11,907,736 B2
(45) Date of Patent: Feb. 20, 2024

(54) INTERACTIVE TIME DELAYED TRANSACTIONS

(71) Applicant: Ari Kahn, Johannesburg (ZA)

(72) Inventor: Ari Kahn, Johannesburg (ZA)

(73) Assignee: STARLOGIK IP LLC, New York, NY (US)

(*) Notice: Subject to any disclaimer, the term of this patent is extended or adjusted under 35 U.S.C. 154(b) by 0 days.

(21) Appl. No.: 15/594,337

(22) Filed: May 12, 2017

(65) Prior Publication Data
US 2017/0329615 A1    Nov. 16, 2017

Related U.S. Application Data

(60) Provisional application No. 62/335,671, filed on May 12, 2016.

(51) Int. Cl.
*G06F 3/0484* (2022.01)
*G06F 9/451* (2018.01)
(Continued)

(52) U.S. Cl.
CPC .......... *G06F 9/451* (2018.02); *G06F 3/04842* (2013.01); *G06Q 20/108* (2013.01);
(Continued)

(58) Field of Classification Search
CPC .... G06F 9/451; G06F 3/04842; G06F 3/0484; G06F 3/0482; G06Q 20/12;
(Continued)

(56) References Cited

U.S. PATENT DOCUMENTS 6,999,566 B1    2/2006  Eason
7,107,526 B1 *  9/2006  Weller .............. G06F 17/30899
                                                   707/E17.119
(Continued)

FOREIGN PATENT DOCUMENTS

CN      103701993 A  *  4/2014  ............ H04M 1/725
JP      2008269371      11/2008
(Continued)

OTHER PUBLICATIONS

CN103701993A—machine translation, Sheng JinGen, "Information sending method and system", Espacenet, pp. 1-9. (Year: 2014).*
(Continued)

*Primary Examiner* — Dino Kujundzic
*Assistant Examiner* — Jianmei F Duckworth
(74) *Attorney, Agent, or Firm* — Greenberg Traurig, LLP

(57) ABSTRACT

An interactive time delayed submission that intentionally delays the actual transmission of a transaction. By embedding a time domain into the submission process, the method and system of the present invention delays actual communication of the transaction request from the client to the server in order to present a window of opportunity for the user to escape (CANCEL) the transaction before the actual transaction is transmitted to the remote process. The method comprises: a) receiving a first transaction submit event at a client interface element; b) activating a timer that pauses submitting the transaction to the server; c) cancelling the pending transaction submission on registering a second cancelling event at a client interface element during the unexpired timer interval; and d) absent registering a second cancelling event at a client interface element, and at timer interval completion, submitting the original transaction from the client to the server.

14 Claims, 3 Drawing Sheets

(51) Int. Cl.
  *G06F 3/04842* (2022.01)
  *G06Q 20/10* (2012.01)
  *G06Q 20/40* (2012.01)
  *H04L 67/01* (2022.01)
  *G06Q 20/12* (2012.01)
  *H04L 67/02* (2022.01)

(52) U.S. Cl.
  CPC .......... *G06Q 20/12* (2013.01); *G06Q 20/407* (2013.01); *H04L 67/01* (2022.05); *G06F 3/0484* (2013.01); *H04L 67/02* (2013.01)

(58) Field of Classification Search
  CPC .... G06Q 20/108; G06Q 20/407; H04L 67/42; H04L 67/1002
  USPC .......................................................... 715/746
  See application file for complete search history.

(56) References Cited

U.S. PATENT DOCUMENTS

| | | | |
|---|---|---|---|
| 8,255,278 | B1 | 8/2012 | Young |
| 9,215,309 | B2 | 12/2015 | Peterson |
| 2007/0140667 | A1* | 6/2007 | Uchimura ........ H04N 21/23614 375/E7.272 |
| 2007/0180028 | A1* | 8/2007 | Chen .................... G06Q 10/107 709/204 |
| 2008/0109732 | A1* | 5/2008 | Rummler ................ H04L 67/02 715/738 |
| 2008/0288883 | A1* | 11/2008 | Pagan .................... G06F 3/0481 715/764 |
| 2009/0228558 | A1* | 9/2009 | Brenner ............... G06Q 10/107 709/206 |
| 2009/0288012 | A1 | 11/2009 | Hertel et al. |
| 2012/0323786 | A1 | 12/2012 | Kirsch |
| 2013/0262564 | A1* | 10/2013 | Wall ..................... H04N 21/812 709/203 |
| 2015/0038121 | A1* | 2/2015 | Koum .................... H04L 51/10 455/412.2 |

FOREIGN PATENT DOCUMENTS

| | | |
|---|---|---|
| JP | 2010266920 | 11/2010 |
| JP | 2012038344 | 2/2012 |

OTHER PUBLICATIONS

Mkyong and Flynn "Cancel Button During Countdown", Feb. 14, 2012, downloaded from https://stackoverflow.com/questions/9246394/cancel-button-during-countdown, pp. 1-2 (Year: 2012).*

Wang et al. "A Field Trial of Privacy Nudges for Facebook", May 1, 2014, downloaded from https://dl.acm.org/doi/pdf/10.1145/2556288.2557413 , pp. 2367-2376 (Year: 2014).*

* cited by examiner

INTERACTIVE TIME DELAYED TRANSACTIONS

CROSS-REFERENCES TO RELATED APPLICATIONS

This application claims priority from U.S. Provisional Application Ser. No. 62/335,671 filed May 12, 2016, which is hereby incorporated herein by reference in in its entirety.

FIELD OF INVENTION

The subject matter relates to systems and methods for delivering a timed submission for electronic transactions that permits a sender to cancel a button once clicked within a specified time before the transaction is actually transmitted from a client to a server.

BACKGROUND

In the highly connected digital economy everything is just a click away. Yet the frenetic pace of digital and online interaction often results in users clicking a submit button before reviewing the transaction details which can result in unintended consequences. These include inadvertently purchasing an item, transferring funds to an incorrect beneficiary, sending a message to an incorrect recipient, sending a message with a glaring typographical error and so on.

In many of the foregoing instances the user immediately recognizes the mistake, however the current state of the transaction art lacks a method to timely escape the transaction submitted. Consequently, there is a need for a seamless method that presents users with a second, just-in-time, opportunity to cancel a submission, without having to explicitly request reversing an already submitted transaction. And without having to introduce a two stage confirmation process which would result in an onerous second confirmation click when most transactions are valid and intended.

BRIEF DESCRIPTION OF DIAGRAMS

GLOSSARY OF TERMS

Figure 1:
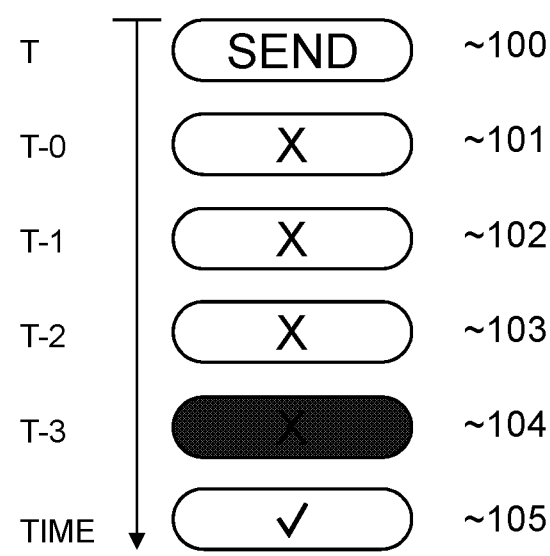
FIG. 1 is a single transaction button that visually encapsulates the disclosed embedded timer functionality.

Client: Local process in an electronic transaction
Server: Remote process in an electronic transaction
Transaction: Data interchange between Client and Server
Button: Common graphical user interface element that invokes transactions
SEND: Button title example that initiates the transaction
X: Indication that transaction may be canceled
Tick: Indication transaction completion
IP: Internet Protocol
HTTP: Hyper Text Transfer Protocol

BRIEF SUMMARY OF EMBODIMENTS OF THE INVENTION

The current state of the art in electronic transaction submission and control presents a button that is activated to immediately initiate and transmit the associated transaction between a client and a server. Once the button has been activated, the transaction cannot be recalled or cancelled without introducing secondary post processing in order to reverse the already submitted transaction.

Up to now, transactions may thus be described as highly triggered, single staged, events where transactions are instantly fired on activation. Once activated, they cannot be recalled within the context of the submission. While transactions may result in subsequent communication between the client and the server, such communication typically serves to communicate to the client whether the transaction was successful or whether it failed. In either event the transaction is substantially instantly transported from client to server once the interface element controlling the submission has been activated. Currently there is no known method to instantly cancel a transaction that has been activated.

The methods and systems disclosed herein, introduce an interactive time delayed submission that intentionally delays the actual transmission of the transaction. By embedding a time domain into the submission process, the method and system of the present invention delays actual communication of the transaction request from the client to the server in order to present a window of opportunity for the user to escape (CANCEL) the transaction before the actual transaction is transmitted to the remote process.

Skilled electronic commerce artisans and application developers will appreciate that while the present embodiment describes clicking a submit button to activate an electronic transaction between a client process and a server process, other input and activation methods may be applied. Alternate activation methods include without limitation, voice activation, touch activation, gesture enabled activations such as swiping and moving a device in a predetermined pattern, and all may similarly incorporate the disclosed time delay method. Similarly, while the present disclosure describes client server interaction, it similarly applies to transactions that are peer to peer in nature, including messaging and payment.

Skilled artisans shall also appreciate that the transports and protocols used to submit a transaction between a local client and a remote server process are varied and well understood. These include, without limitation, well known standards such as HTTP and HTTPS GET and PUT methods, Socket based transactions, JSON (JavaScript Object Notation) data interchange and similar API (Application Programming Interfaces) supporting data interchange between local and remote processes. The most prevalent transport between client and server is IP (Internet Protocol).

Further, artisans will appreciate that while the figures and the visual transformations presented are simplified they are nonetheless explicit and instructive, and serve to highlight the key aspect of the present invention. It is clear that permutations of the interface element visual transformations are possible and the examples presented are not intended to be exhaustive. Regardless of the visual presentation of the interface element encapsulating the timer delayed functionality, the key disclosure that teaches a timer delayed transaction transmission, remains consistent. Regarding networking and logical elements involved in a transaction data interchange, some steps are condensed and others are omitted to improve understanding of the embodiments of the present invention.

DETAILED DESCRIPTION

FIG. 1. Describing the timer delayed transaction system and method in greater detail with reference to FIG. 1, a computer implemented method and system, operable on a system with a processor and a memory, with instructions stored thereon, comprises the following:

100: User clicks SEND button.

The SEND button is programmatically controlled by a timer, T, that begins counting down a specified time interval on the first click. This timer interval is the period in which the transaction is intentionally paused before actually transmitting the transaction, to afford the user an opportunity to CANCEL the now pending transaction. In an exemplary embodiment the timer is set to count down three seconds.

101: At T-0 seconds, representing the moment the button is clicked and the timer is activated, in one embodiment the button title programmatically changes to an X while the timer is in effect, to indicate that the user may click the button a second time in order to cancel the pending transaction.

In a preferred embodiment, the button visually indicates timer T countdown with a progress bar that proportionately fills the button along the horizontal axis. This progress bar is shaded gray for illustrative purposes in the referenced figure.

In a three second timer embodiment at T-0 seconds, the moment the button has first been activated, the button title changes to "X" indicating to the user they may click again to cancel the pending transaction.

102: At T-1 seconds, one third of the now X titled button is color filled, still permitting the user to cancel the pending transaction.

103: At T-2 seconds, two thirds of the X titled button is color filled, still permitting the user to cancel the pending transaction.

104: At T-3 seconds, the X Titled button is completely color filled, presenting the user with the last opportunity to cancel the now imminent transaction.

At any stage during the active timer process, the user may thus click the button or press an appropriate key such as ESCAPE, to cancel the pending transaction. In a preferred embodiment the button is then reset to the original SEND state permitting the user to restart the transaction, typically after making any required corrections to the transaction.

105: Once the timer has expired, absent a second cancel click from the user, the button emits the transaction interchanging data for the current transaction between the client and the server. In a preferred embodiment, on the timer expiry and transaction transmission, the button displays a tick mark to indicate successful completion.

In an alternate embodiment, once the SEND button is clicked and the timer is activated, the button may programmatically change colors to indicate transition states following universal traffic signaling as in:

At T-1 the button goes RED to signal "Stop". This indicates that the transaction had been paused and the user may click again to stop/cancel the pending transaction.

At T-2 the button goes ORANGE to signal "Shift". This Indicates to the user that the transaction is about to move forward to completion. The user may still click again to CANCEL the pending transaction.

At T-3 the button goes GREEN to signal "Go". This Indicates to the user that the transaction is green lighted for completion. This is the last opportunity to click and CANCEL the pending transaction.

At Timer expiry the button goes BLUE to signal "Communication". This indicates that the transaction was successfully communicated to the server and completed. The user may no longer cancel the transaction using the disclosed method.

While the preferred embodiment teaches integrating CANCEL functionality in a single user interface element (button), it will be evident that a second interface element may be introduced to achieve the same result.

For example, on clicking a SEND button, the SEND button may be programmatically disabled (dimmed) and a second UNDO/CANCEL button may be adjacently or prominently displayed.

This second UNDO button is then activated (clickable) for the duration of the disclosed timer delayed period, permitting the user to click the second UNDO button to achieve the same result as secondary clicking a single interface element, which simply switches its title programmatically to display CANCEL as described above.

In yet another embodiment, a single interface element may simply programmatically change its title to statically display a cancelation option for the duration of the timed delay. In such a statically displayed timer embodiment, on activating a SEND button the said button could change its title to display UNDO for the duration of the timer, permitting the user to "reverse" the transaction.

While the said button may display UNDO, it shall be technically evident given the time delayed transmission method disclosed, that the transaction has not actually been transmitted at this time, and consequently UNDO would simply perform a conceptual undoing rather than a transaction reversal, which is what would be required had a transaction actually been transmitted.

Figure 2:
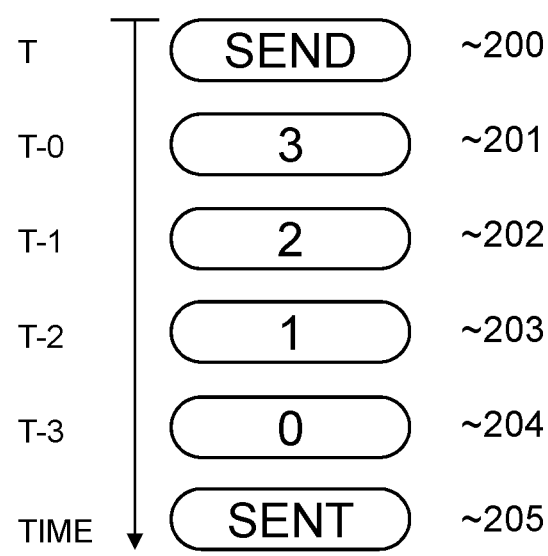
FIG. 2 is an alternate rendition of the single transaction button that visually encapsulates the disclosed embedded timer functionality.

FIG. 2. Describing an alternate visual presentation for the timer delayed transaction system and method with reference to FIG. 2:

200: User clicks SEND button.

The SEND button is programmatically controlled by a timer, T, that begins counting down a specified time interval on the first click. This timer interval is the period in which the transaction is intentionally paused before actually transmitting the transaction, to afford the user an opportunity to CANCEL the now pending transaction. In an exemplary embodiment the timer is set to count down three seconds.

201: At T-0 seconds, representing the moment the button is clicked and the timer is activated, the button title programmatically changes to reflect the count down timer. In this three second timer embodiment, the button displays the numeral "3" to indicate that three seconds are remaining for the user to CANCEL the transaction. The user simply clicks the button again to CANCEL.

202: At T-1 seconds, the numeral "2" is displayed indicating that two seconds are remaining for the user to CANCEL the transaction.

203: At T-2 seconds, the numeral "1" is displayed indicating that one second are remaining for the user to CANCEL the transaction.

204: At T-3 seconds, the numeral "0" is displayed indicating that the delay time is expired, presenting the user with the last opportunity to cancel the now imminent transaction.

At any stage during the active timer process, the user may thus click the button or press an appropriate key such as ESCAPE, to cancel the pending transaction. In a preferred embodiment the button is then reset to the original SEND state permitting the user to restart the transaction, typically after making any required corrections to the transaction.

205: Once the timer has expired, absent a second cancel click from the user, the button emits the transaction interchanging data for the current transaction between the client and the server. In the illustrated embodiment, on the timer expiry and transaction transmission, the button displays SENT to indicate successful transmission.

Figure 3:
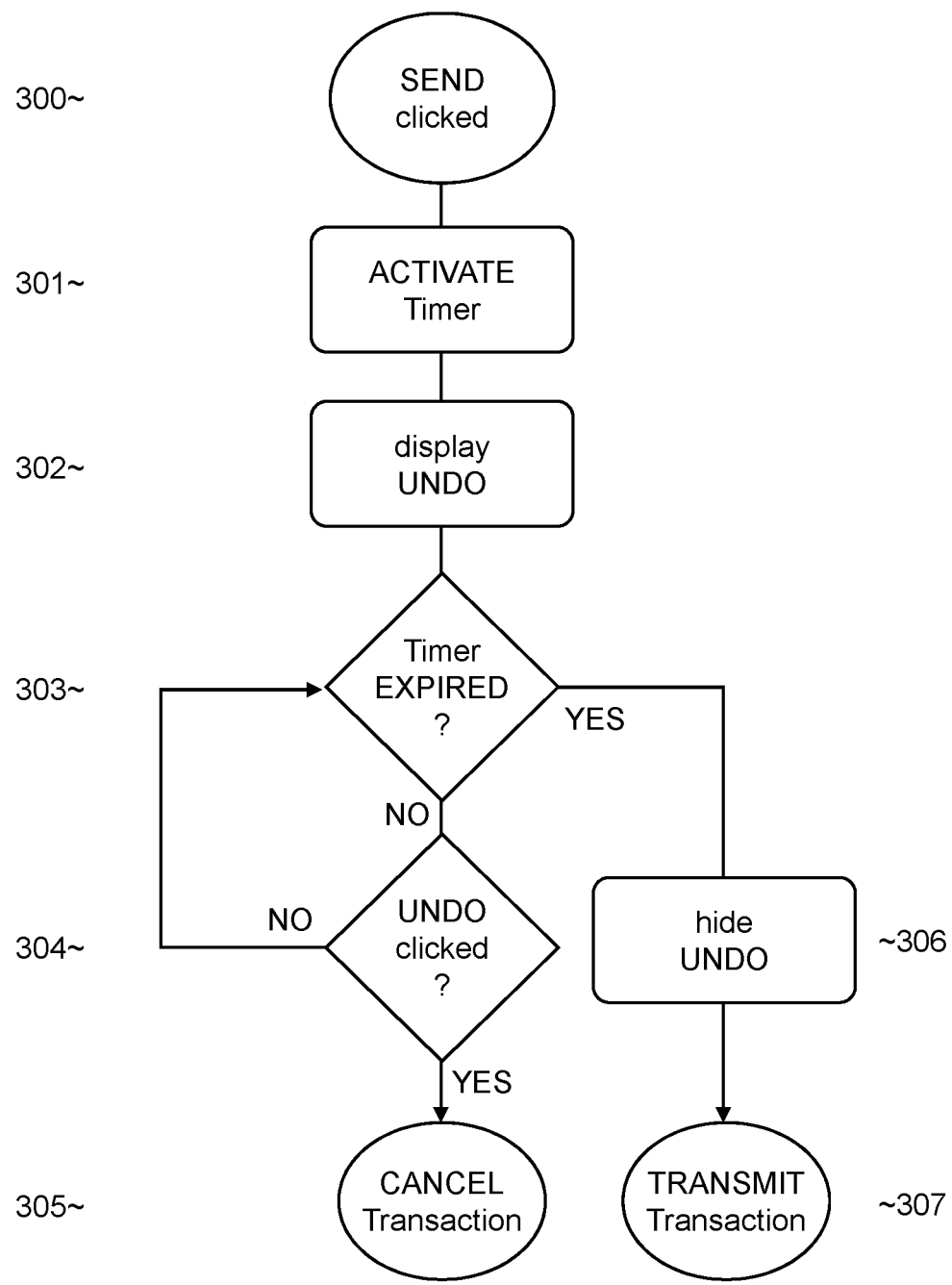
FIG. 3 is a flow chart depicting the timer delayed transaction submission and cancellation logic.

FIG. 3. In another embodiment of the system for time delayed submission of a clicked transaction, the timed transactional data interchange between the client and the server is described with reference to FIG. 3.

300: User clicks the transaction SEND button.

301: System activates a count down/up timer.

302: System displays an UNDO user interface element (button).

303: System checks timer validity.

If the timer has not expired then the system proceeds to step 304. If the timer has expired then the system proceeds to step 306.

304: System checks whether the user has clicked UNDO.

If the user has clicked the UNDO feature then the system proceeds to step 305. If the user has not clicked UNDO, the system proceeds back to step 303.

Count down/up Timer logic is well understood by programmers. At discrete intervals (typically seconds) the timer is either decremented towards zero (count down timer) or incremented up to a preset threshold (count up timer). The timer has expired (completed) on either reaching zero or the threshold, depending on whether the timer is decremented or incremented.

305: The transaction is not transmitted in response to the user clicking UNDO within the active timer period.

306: The UNDO feature is removed or disabled.

307: The transaction is transmitted as the timer has expired and the user has not canceled.

The disclosed interactive timer delayed transaction system and method delivers a seamless unified and integrated submission and cancelation functionality in a single user interface element (button) that does not interfere with transactional flow and does not require the user to interact with any additional interface elements in order to exact control over a transaction.

The method and system of the present invention may be automatically applied by an internet browser to all such transactional elements rendered within a browser's window. In such an automated browser embodiment, a browser vendor may permit users to enable such a delayed submission feature in the browser application settings where the user may set the timer delay. While any website or application may selectively include the disclosed timer delayed submission method, enabling it at an operating system level or within a browser's framework elevates the functionality across all applications and web services.

In one embodiment, a browser scans each page or window opened in the browser for client to server transmit buttons. If a window or page, contains one or more client to server transmit buttons, the browser overlays a graphical element as illustrated in FIG. 1 or 2, and performs the method described in FIG. 1, 2 or 3 upon a user clicking the transmit button.

In an embodiment, a method for interactively controlling an electronic transaction submission between a client and a server comprises, in a step, programmatically searching for any client to server transaction buttons in the scripts received for rendering a web page. In a step, modifying the script controlling the located transaction buttons to incorporate the timer delayed transaction submission method disclosed. In another step, receiving a first transaction submit event at the client to server transaction button. In a further step, activating a timer that pauses submitting the transaction to the server. In still another step, overlaying a graphical element on to the client to server transaction button that indicates to the client that the transaction has been paused and a timer has been activated. In a step, cancelling the pending transaction submission if a second cancelling event is received at the graphical element during the unexpired timer interval. In another step, absent registering a second cancelling event at the graphical element, and at timer interval completion, submitting the original transaction from the client to the server.

What is claimed is:

1. A method, comprising:
  receiving, by a client device, via a browser application, a user interface software script for rendering, to a user, a user interface comprising a client-to-server action interface element;
  automatically identifying, by the client device, a client-to-server action interface element software script in the user interface software script for rendering the user interface comprising the client-to-server action interface element;
  automatically modifying, by the client device, the client-to-server action interface element software script to incorporate a timer to allow the user to enable, based on a status of a user setting in the browser application, the client-to-server action interface element to switch between:
    a submittable state and
    a cancellable state;
    wherein programming instructions to the client-to-server action interface element comprises at least one programming instruction for the timer that is utilized for controlling a submission of an execute instruction from the client device to a server, to execute an activity that is operationally linked to the client-to-sever action interface element;
  receiving, by the client device, a client-to-server interaction submitting event when the user activates the client-to-server action interface element while the client-to-server action interface element is in the submittable state;
    wherein the client-to-server interaction submitting event represents that the user desires the activity to be executed by the server;
  executing, by the client device, upon the receiving of the client-to-server interaction submitting event, the at least one programming instruction of the timer to activate the timer;
  switching, by the client device, during an unexpired interval of the timer, the client-to-server action interface element into the cancellable state;
  determining, by the client device, during the unexpired interval of the timer, a lack of a client-to-server interaction cancelling event with the client-to-server action interface element;
    wherein the client-to-server interaction cancelling event represents that the user desires to cancel the activity; and
  changing, by the client device, after the switching the client-to-server action interface element into the cancellable state and during the unexpired interval of the timer, a visual appearance of the client-to-server action interface element; and
  submitting, by the client device, to the server, in response to the lack of the client-to-server interaction cancelling event and after the timer expired, the execution instruction to execute the activity.

2. The method of claim 1,
  wherein the activity is a transaction;

wherein the client-to-server interaction submitting event is a transaction submitting event that represents that the user desires the transaction to be executed; and wherein the client-to-server interaction cancelling event is a transaction cancelling event that represents that the user desires to cancel execution of the transaction.

3. The method of claim 1, wherein the user interface is a web page or an application window.

4. The method of claim 1, wherein the changing the visual appearance of the client-to-server action interface element comprises changing the visual appearance to represent an amount of time remaining before the timer expires.

5. The method of claim 1, wherein the changing the visual appearance of the client-to-server action interface element comprises changing either a color of the client-to-server action interface element, a number displayed on the client-to-server action interface element, or a shaded amount of the client-to-server action interface element.

6. The method of claim 1, wherein the changing the visual appearance of the client-to-server action interface element comprises changing the visual appearance of the client-to-server action interface element at least twice to represent different amounts of time remaining before the timer expires.

7. The method of claim 6, wherein the changing the visual appearance of the client-to-server action interface element comprises changing, at least twice, either a color of the client-to-server action interface element, a number displayed on the client-to-server action interface element, or a shaded amount of the client-to-server action interface element.

8. A system comprises:
a client device, comprising:
   a non-transient computer memory, storing software instructions and
   a processor;
wherein, when the processor executes the software instructions, the client device is programmed to:
   receive, via a browser application, a user interface software script for rendering, to a user, a user interface comprising a client-to-server action interface element;
   automatically identify a client-to-server action interface element software script in the user interface software script for rendering the user interface comprising the client-to-server action interface element;
   automatically modify the client-to-server action interface element software script to incorporate a timer to allow the user to enable, based on a status of a user setting in the browser application, the client-to-server action interface element to switch between:
      a submittable state and
      a cancellable state;
      wherein programming instructions to the client-to-server action interface element comprises at least one programming instruction for the timer that is utilized for controlling a submission of an execute instruction from the client device to a server, to execute an activity that is operationally linked to the client-to-sever action interface element;
   receive a client-to-server interaction submitting event when the user activates the client-to-server action interface element while the client-to-server action interface element is in the submittable state;
      wherein the client-to-server interaction submitting event represents that the user desires the activity to be executed by the server;
   execute, upon the receipt of the client-to-server interaction submitting event, the at least one programming instruction of the timer to activate the timer;
   switch, during an unexpired interval of the timer, the client-to-server action interface element into the cancellable state;
   determine, during the unexpired interval of the timer, a lack of a client-to-server interaction cancelling event with the client-to-server action interface element;
      wherein the client-to-server interaction cancelling event represents that the user desires to cancel the activity;
   change, after the switch of the client-to-server action interface element into the cancellable state and during the unexpired interval of the timer, a visual appearance of the client-to-server action interface element; and
   submit to the server, in response to the lack of the client-to-server interaction cancelling event and after the timer expired, the execution instruction to execute the activity.

9. The system of claim 8,
wherein the activity is a transaction;
wherein the client-to-server interaction submitting event is a transaction submitting event that represents that the user desires the transaction to be executed; and
wherein the client-to-server interaction cancelling event is a transaction cancelling event that represents that the user desires to cancel execution of the transaction.

10. The system of claim 8, wherein the user interface is a web page or an application window.

11. The system of claim 8, wherein, when changing the visual appearance of the client-to-server action interface element, the client device is programmed to change the visual appearance to represent an amount of time remaining before the timer expires.

12. The system of claim 8, wherein, when changing the visual appearance of the client-to-server action interface element, the client device is programmed to change either a color of the client-to-server action interface element, a number displayed on the client-to-server action interface element, or a shaded amount of the client-to-server action interface element.

13. The system of claim 8, wherein, when changing the visual appearance of the client-to-server action interface element, the client device is programmed to change the visual appearance of the client-to-server action interface element at least twice to represent different amounts of time remaining before the timer expires.

14. The system of claim 13, wherein, when changing the visual appearance of the client-to-server action interface element, the client device is programmed to change, at least twice, either a color of the client-to-server action interface element, a number displayed on the client-to-server action interface element, or a shaded amount of the client-to-server action interface element.

* * * * *